June 2, 1931. G. LANGFORD 1,808,467
DIES FOR MAKING BARS
Filed April 10, 1929 6 Sheets-Sheet 1
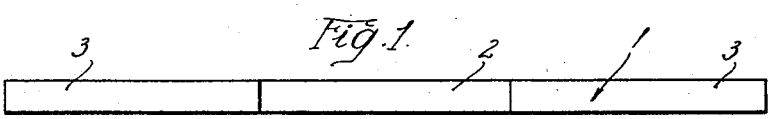
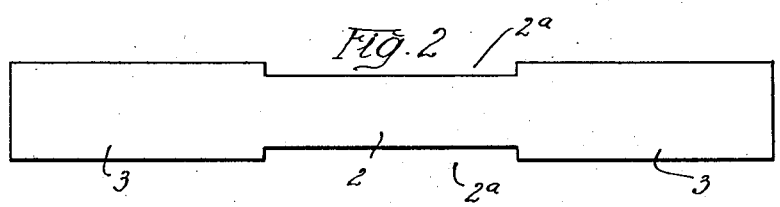
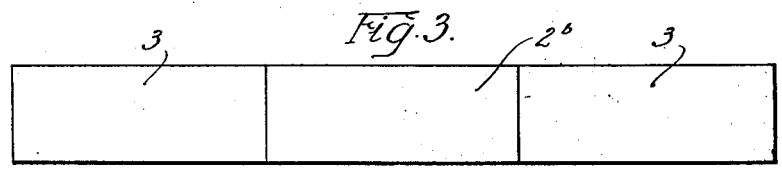
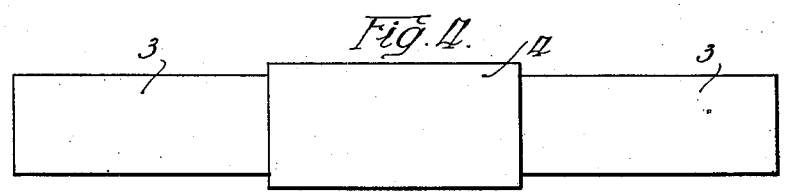
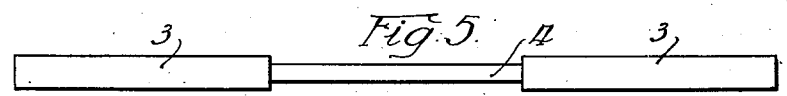
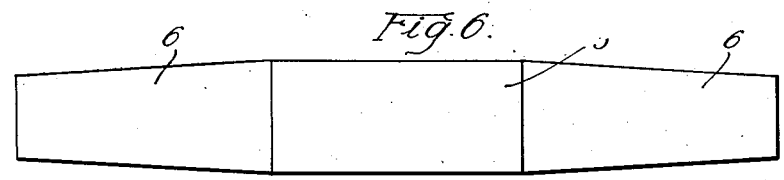
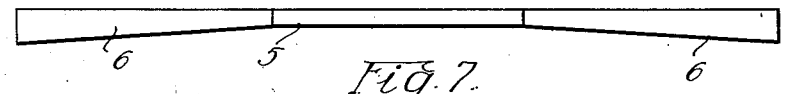
Inventor:
George Langford
By Brown, Jackson, Boettcher & Dienner
Attys.

June 2, 1931.         G. LANGFORD         1,808,467
DIES FOR MAKING BARS
Filed April 10, 1929    6 Sheets-Sheet 2
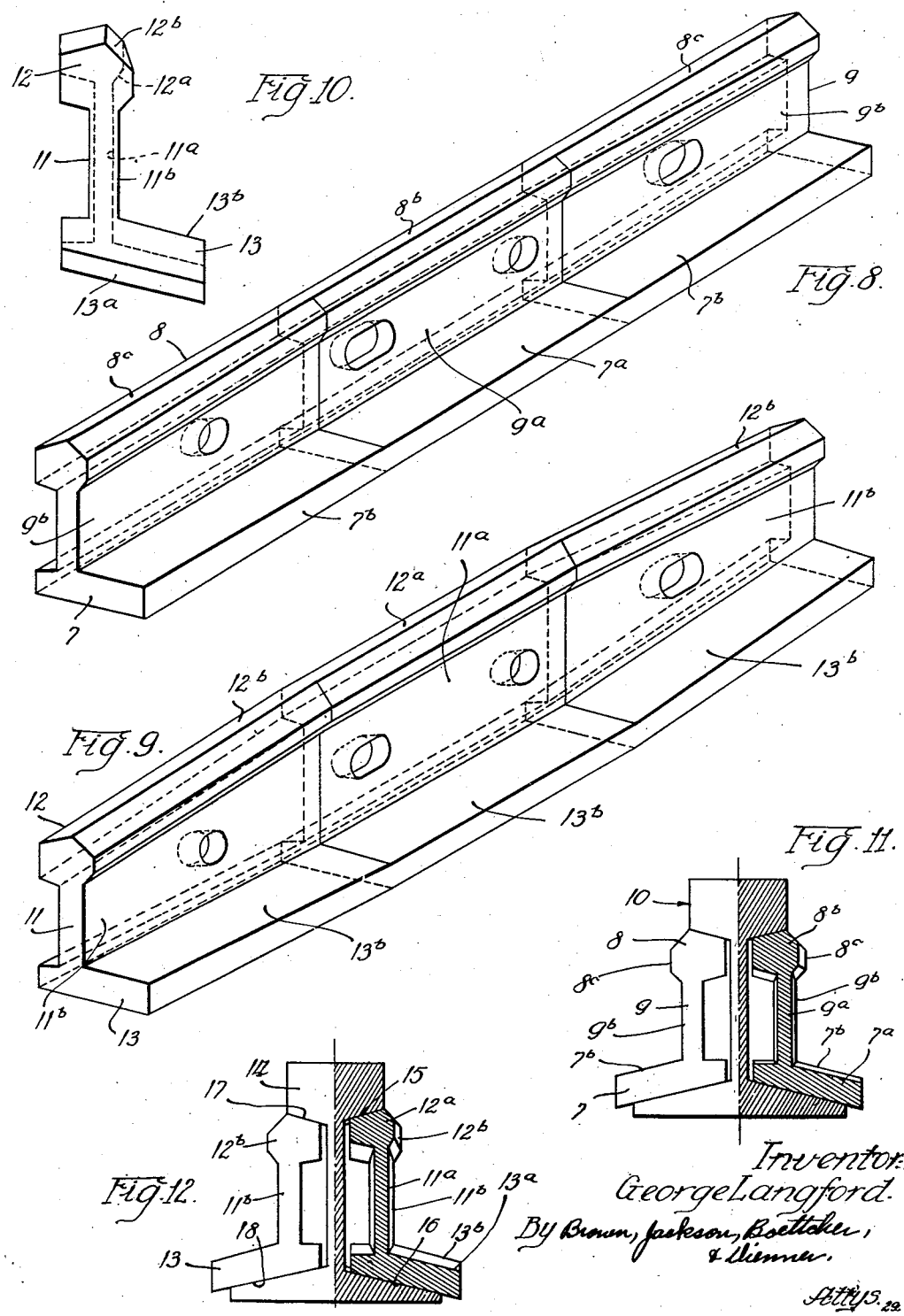

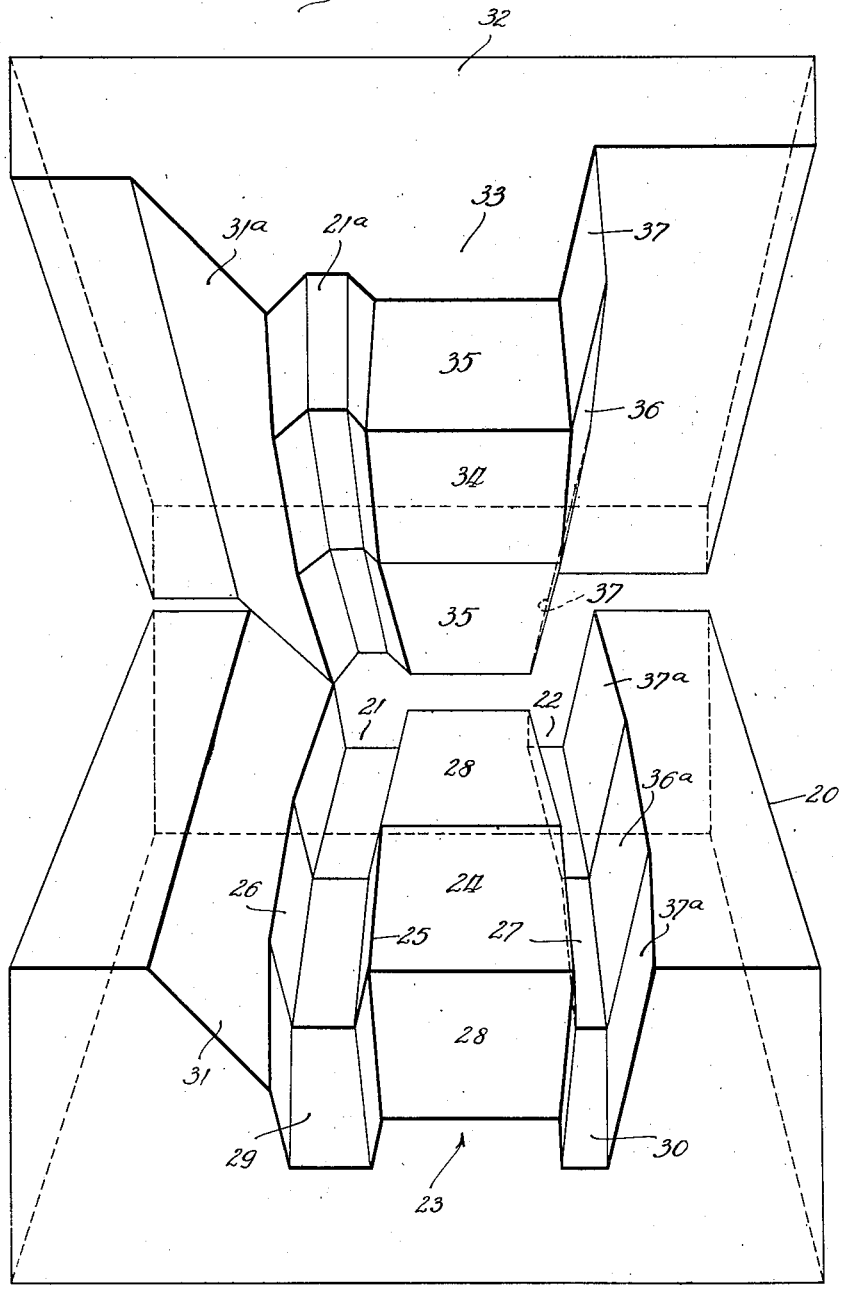

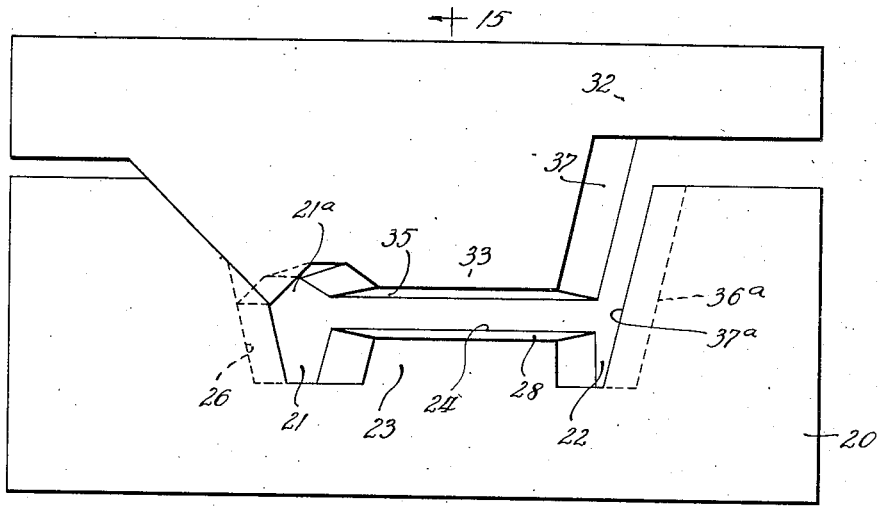
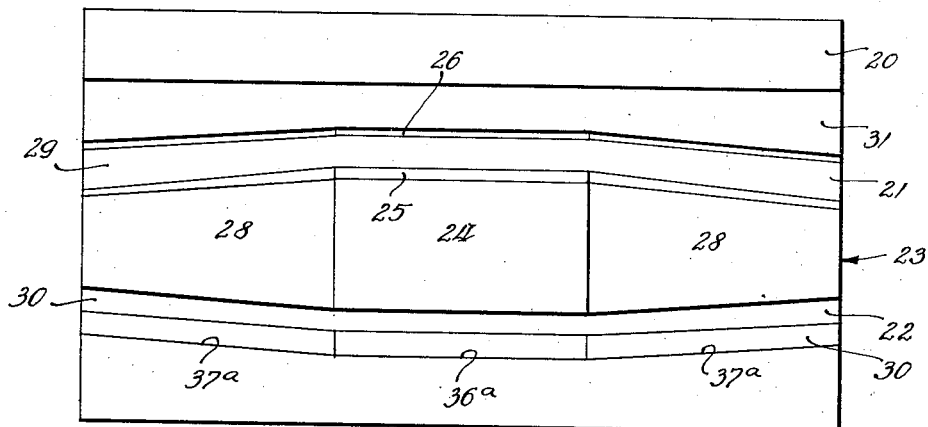
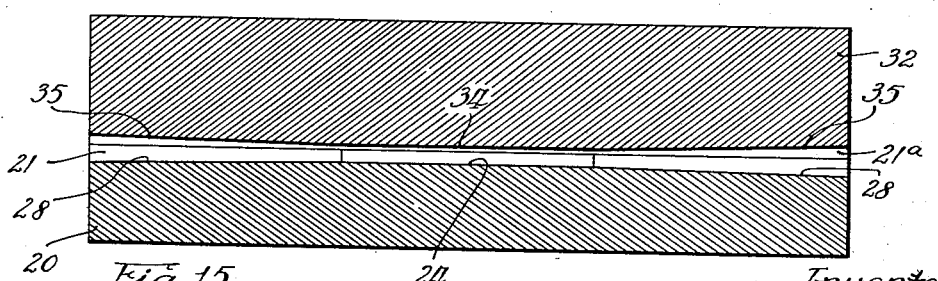

June 2, 1931.   G. LANGFORD   1,808,467
DIES FOR MAKING BARS
Filed April 10, 1929   6 Sheets-Sheet 5

Inventor:
George Langford.
By Brown, Jackson, Boettcher & Diener.
Attys.

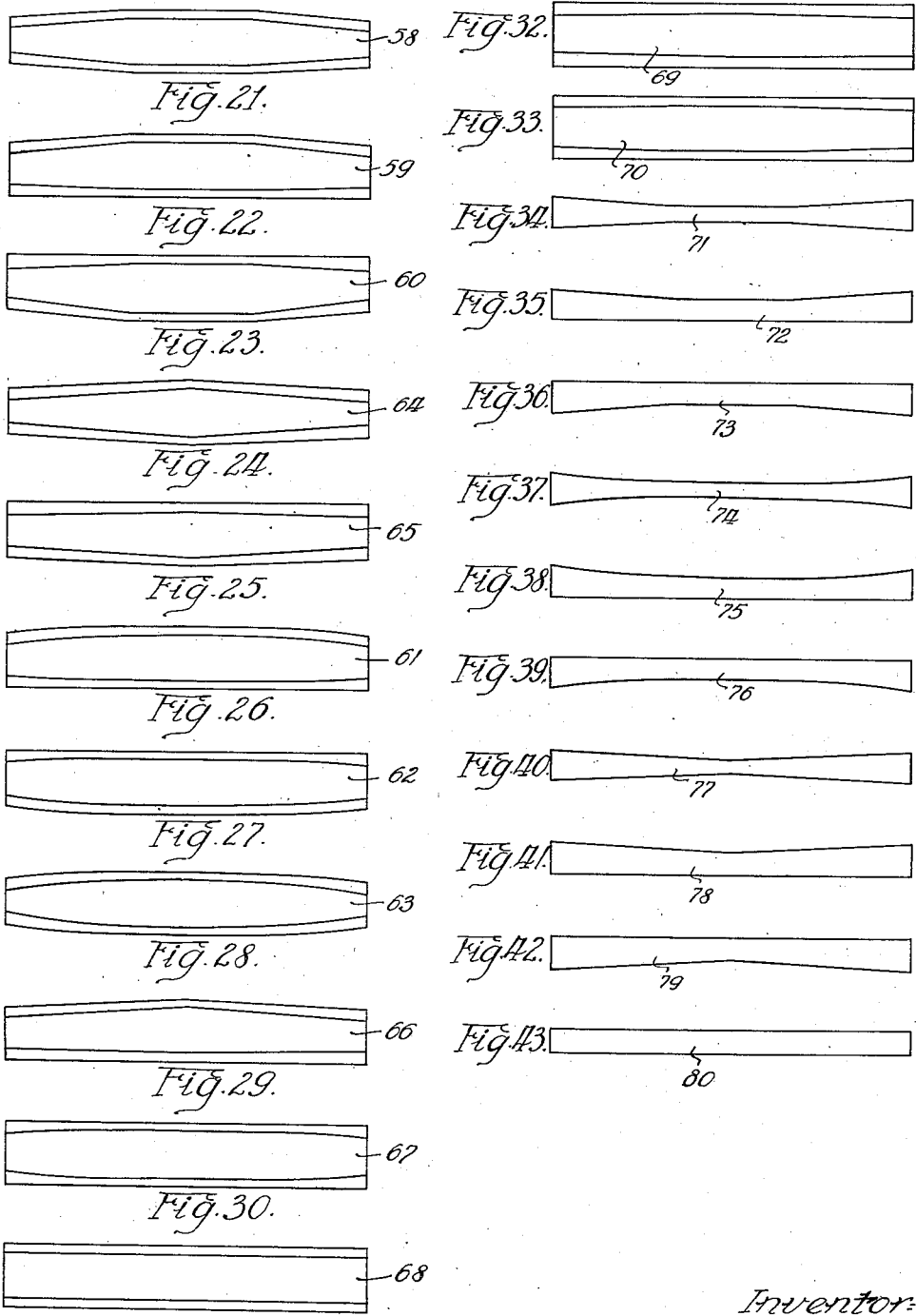

Patented June 2, 1931

1,808,467

UNITED STATES PATENT OFFICE

GEORGE LANGFORD, OF JOLIET, ILLINOIS, ASSIGNOR TO McKENNA PROCESS COMPANY OF ILLINOIS, OF JOLIET, ILLINOIS, A CORPORATION OF ILLINOIS

DIES FOR MAKING BARS

Application filed April 10, 1929. Serial No. 354,142.

My invention relates to bars used in rail joints, and more particularly to dies for reforming worn bars.

It is known that in use in the track the head and flange bearing surfaces of the bars wear away at the center one-third or one-fourth of the length of the bars at a much greater rate than at the end portions of the bar. A bar which has been worn in this manner to such an extent as to render it difficult or impossible to obtain a tight fit between the fishing surfaces of the rails and the center portions of the bars is unfit for service and must be replaced. Such a bar can, however, be reformed so as to restore its original fishing height at the center portion of the bar or, if desired, in reforming this bar, the center portion thereof can have the fishing surfaces and fishing height increased beyond its original fishing height.

It has been proposed heretofore to reform worn bars by heating them and then subjecting them to pressure in closed dies, the bars being pressed throughout their lengths and without provision for properly restoring the heights and widths of head and flange fishing surfaces at the central portion of the bars where wear is greatest, without which provision, the pressure required for reforming is so great as to break even the largest commercial presses. I have conceived the possibility of diminishing widths and thicknesses of the closed die cavities at their central portions so as to apply pressure for necessary spread of metal for filling out the worn parts and restoring the height of fishing at the central portion of the bar, or if desired increasing the height of the bar, or increasing the height of fishing at such portion. I have found that in using ordinary straight sided and straight surface dies to spread out or thin the center portion of the bar, difficulty is encountered and enormous pressure is required, due to the fact that such dies bear too much on the end portions of the bar and on the portions intermediate the ends and the central portion, and not enough on the center portion, so that it is impossible, in the case of badly worn bars, to obtain the desired spreading out or thinning of the bar at the center portion thereof.

In reforming a bar, I use dies having forming surfaces which converge inwardly of the dies in such manner as to obtain the desired spreading of the metal, the greatest pressure of the dies being applied at the central portion of the bar, as the dies are closed, so as to effect the desired spreading action, the end portions of the bar being relieved of or having the least pressure and, therefore, not opposing closing of the dies. This renders it possible to readily spread the center portion of the bar to the desired extent and with the application of but relatively small pressure. This has the further advantage that the head and flange fishing surfaces of the bar, particularly at the center portion thereof, are accurately formed and the fishing height of the reformed bar is also accurate, thus assuring accuracy between the fishing of the bar and the fishing of the rail end. This is particularly important at the center portion of the bar.

There are short and long angle bars in use, the former varying from 24 to 28 inches in length, and the latter varying from 36 to 42 inches in length. My invention applies equally to all lengths of bars, though for the purpose of illustration I have shown in the accompanying drawings a short bar. My invention also applies to bars which may be tapered throughout their entire section or to bars one or more elements, only, of which may be tapered.

In practicing my method I employ dies of special construction, the passes and forming walls of which are so related and disposed as to spread the central portion of the bar so as to increase the fishing height of such central portion, this spreading action being accomplished by displacing the metal at the central portion thereof, this displacement being applied either to the whole surface of the bar or to selected surfaces thereof. Constructing the dies in this manner renders it possible to readily reform bars so as to restore or increase the fishing height of the central portion thereof by the application of relatively small or medium pressures. Dies constructed in this manner accomplish a number of purposes. The greatest pressure may be concentrated at the central worn portion of the bar by overcoming the resistance of the less worn portions intermediate between the central portion and ends. The pressure at center may also be applied to effect a greater lateral movement of metal at center, and this pressure may be made to apply first at center, this being followed by waves of pressure from the center toward each end. These waves of pressure may also be graduated from center toward the ends by graduating the thickness of one or more elements of the closed die cavities, the cavities increasing in width or depth or both from the central portion outward toward each end. This I believe to be broadly new in the art of reforming rail joint bars.

The novelty of my invention lies in the die construction where with the use of die surface convexities which decrease the closed die cavity cross sectional area at the center and increase it at the ends, the result is a composite pair of dies whose central portion functions differently than the end portions, the reformed bar completely filling the dies at the central portion and incompletely filling the dies at the two end portions.

The main object of my invention is to insure sufficient pressure and movement of metal at the central portion of the bar to properly restore or raise the fishing height at that portion. Another object is to restore the worn central portion of a bar, at the same time maintaining the fishing alignment of the bar as a whole. Still another object is to reform a bar with a minimum of pressure. Still another object is to reform a bar with a minimum of distortion in cross section or longitudinally.

Further objects and advantages of my invention will appear from the detailed description.

In the drawings:

Figure 1 is a plan view of a worn bar;

Figure 2 is a side view of the bar of Figure 1;

Figure 3 is a side view of a bar having its center portion restored to its original fishing height by reforming a bar such as that shown in Figure 2;

Figure 4 is a side view of a bar having its center portion of increased fishing height so as to be crowned at both the top and the bottom, such a bar being produced by reforming the bar of Figure 2;

Figure 5 is a plan view of the bar of Figure 4;

Figure 6 is a side view of a bar reformed in accordance with my invention and crowned at both top and bottom;

Figure 7 is a plan view of the bar of Figure 6;

Figure 8 is a perspective outer side view of an uncrowned bar produced in accordance with my invention;

Figure 9 is a view similar to Figure 8 of a crowned bar;

Figure 10 is an end view of the bar of Figure 9;

Figure 11 is an end view of a rail joint illustrating the bar of Figure 8 as applied, one-half of the joint being sectioned at the central vertical plane thereof;

Figure 12 is a view similar to Figure 11 showing the bar of Figure 9 as applied;

Figure 13 is a perspective view of the dies, the upper die being tilted upwardly away from the lower die;

Figure 14 is an end view of the dies in closed position;

Figure 15 is a section taken substantially on line 15—15 of Figure 14;

Figure 16 is a plan view of the lower die;

Figures 21 to 33 are side views of bars disclosing numerous variations for obtaining the desired spreading or increase in fishing height of the center portion of the bar;

Figures 34 to 43 are plan views of bars illustrating various ways of obtaining the desired tapered effect and spreading of the central portion of the bar.

Figure 17:
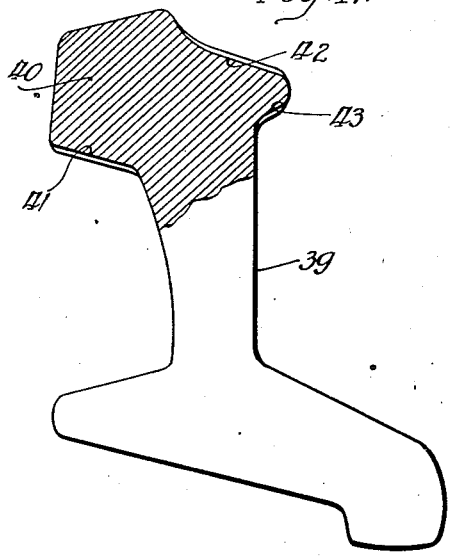
Figure 17 is an end view of a modified form of bar the head portion thereof being sectioned at the center portion of the bar.

In Figures 1 to 7 of the drawings I have illustrated, more or less diagrammatically, the problem to be solved. In Figure 1, I have illustrated a flat bar 1, the center portion 2 of which has been worn down at both the top and the bottom, at 2ª, to such an extent that the fishing height of this center portion is much less than that of the end portions 3.

Figure 2 represents such a bar in side view, this being assumed to be a bar which has been in use for a long time. The amount of wear of the center portion of the bar has been exaggerated so as to be readily perceivable and to more clearly illustrate conditions which exist in practice. The problem is to restore the fishing height of the center portion 2 of the bar to the height of the end portions 3, as in Figure 3, or to provide from the bar of Figures 1 and 2 a bar having a center portion the fishing height of which is greater than that of the end portions, as in Figure 4. In Figure 3, the restored center portion 2ᵇ is equal in fishing height to the end portions 3, whereas, in Figure 4, the fishing height of the center portion 4 is greater than that of the end portions 3. To produce the crowned bar of Figure 4 from the bar of Figures 1 and 2, the center portion of the bar is pressed inwardly from the opposite sides thereof, as in Figure 5. By pressing the center portion of the bar to a less extent than in Figure 5, the bar of Figure 3 is produced. It is thus possible to readily restore or increase the fishing height of the center portion of a worn bar, as desired. It will be noted that in Figure 5 the pressure on the end portions 3 of the bar is slight or nil. Also, in this figure, the center portion 4 is illustrated as being pressed inwardly from both sides of the bar, so as to be expanded or spread toward the top and bottom edges of the bar. Obviously, the same result can be accomplished by pressing the center portion of the bar inwardly from one face only.

It may be seen from the preceding description that the main problem of reforming is to restore the central portion of the worn bar, the end portions because of their comparatively unworn condition requiring little and in some cases practically no reforming. By comparison of Fig. 2 a worn bar and Fig. 3 reformed bar made from Fig. 2, only the central portion of the worn bar has been reformed, in fishing height, the end portions remaining practically unchanged. This is also true of Fig. 4 a crowned bar reformed from the worn bar of Fig. 2. It may also be seen that as regards horizontal thickness, Fig. 5 is a crowned bar reformed from the worn bar of Fig. 1 and has its end portions unchanged, the displacement of metal required to restore the fishing height being confined to the central portion of the bar. Assuming Figs. 3, 4 and 5 to represent closed die cavities, if the end portions of the cavities are no narrower nor thinner than the end portions of the worn bars, there will be little or no pressure upon the end portions of the bars as the dies close under pressure, thus concentrating the pressure upon the central portion of the bar. While there are certain types of bars whose central portions may be sharply elevated as in Fig. 4, the greater length of fishing contact usually found desirable results in the ordinary crowned bar form of Fig. 6 which is shown crowned on its top and bottom fishing surfaces, although in practice it is customary to put all or the greater part of the crowning on the top fishing surface of the bar. Unlike Fig. 4, the bar of Fig. 6 is provided for full length fishing contact and may be fitted to unworm rail end by flexing in the ends, or it may be fitted to worn rail ends with little or no end flexure. This form of crowned bar therefore requires that one or both of its fishing surfaces must taper from the central portion of the bar to the ends so as to reduce the fishing height from the center to the ends as in Fig. 6. This tapering of the fishing surfaces vertically obviously calls for spreading of metal intermediate the central portion and ends, requiring intermediate pressure in addition to the pressure required to restore the height of the worn central portion of the bar. To accomplish this the vertical spreading action is applied as in Fig. 7, being greatest at the central portion of the bar and decreasing gradually to the ends. This tapering from the central portion of the bar to the ends shown in Figs. 6 and 7 obviously requires greater reforming pressure than the method shown in Figs. 4 and 5 where no vertical or horizontal tapering is employed and there is little or no pressure on the end portions 3. Inasmuch as the central wear in bars is actually more concave than shown in Fig. 2 and that the central displacement of metal must therefore be greater at the very center, decreasing outwardly, the application of vertical pressure in dies shown in Fig. 7 is more preferable than the application of vertical pressure as shown in Fig. 5 to produce the uncrowned bar of Fig. 3 as well as the crowned bar of Fig. 6. As has been shown however, the methods illustrated in Figs. 4 and 5 will require much less pressure for reforming the worn central portion of the bar than that required by the method illustrated in Figs. 6 and 7, assuming that Figs. 3 to 7 inclusive represent the closed die cavities, as well as the bars reformed in them. To compensate for the increased pressure required to reform bars of Figs. 6 and 7 over those of Figs. 4 and 5, I increase the tapers of the end portions 6 in Fig. 7 and continue them farther into the central portion 5, the result being more of a convexity than shown in Fig. 7 and with the outer part of the end portions of the closed die cavity enlarged to a point where the end portions of the bars do not completely fill the dies, advantage being taken of the comparatively slightly worn condition of the bar ends to relieve them of reforming pressure so as to effect the necessary concentration of pressure at the central portion of the closed die cavity to properly reform the worn central portion of the bar. To summarize, the problem of pressure and metal distribution, simplified in Figs. 4 and 3 by reforming only the worn central portion 4 of the bar and not reforming the comparatively unworn ends 3, but resulting in the one case of Fig. 4 as a bar without full length fishing contact, is met in the more desirable form of crowned bar in Fig. 6 as compared with that of Fig. 4, by effecting the more difficult distribution of metal and application of pressure in dies so designed with longitudinally convexed surfaces tapering outward to the ends that the end portions of the bar will not completely fill the dies, thus effecting better concentration of pressure and distribution of metal where most needed.

In Figure 8, I have illustrated a bar formed in accordance with my method, this bar being produced by reforming a worn bar and restoring the fishing height of the center portion thereof to the same height as the fishing of the end portions of the bar. In this bar, the center portion 7$^a$ of the flange 7 is of less thickness than the end portions 7$^b$ which taper inwardly in thickness from the ends of the bar to the center portion thereof. It will also be noted that the center portion 8$^b$ of the head 8 is of less thickness than the end portions 8$^c$ which taper in thickness from the ends of the bar to the center portion thereof. The center portion 9$^a$ of the web 9 is of less thickness than the end portions 9$^b$ thereof which taper in thickness from the ends of the bar. This will be understood more clearly by reference to Figure 11, which shows two bars similar to that of Figure 8 applied to a rail, one of the bars being shown in end view and the other bar being shown in section, the section being taken at the center of the bar. As will be noted from this figure of the drawings, center portion 9$^a$ of the web of the bar at the right hand side of rail 10 is appreciably thinner than the end portions 9$^b$ of the web of the bar at the left of the rail. It will also be noted that the center portion 8$^b$ of the head of the right hand bar is of appreciably less width and vertical thickness than the end portions 8$^c$ of the head of the bar at the left of the rail.

The center portion 7$^a$ of flange 7 of the right hand bar is of appreciably less vertical thickness than the end portion 7$^b$ of the flange of the left hand bar. It will thus be seen that the bar of Figure 8 has been produced by tapering the entire section of the bar from each end thereof to the center portion of the bar. I thus displace metal from the head and flange of the bar, as well as the web thereof, and cause this metal to flow toward the head and flange of the bar at the center portion thereof so as to restore the fishing height. This is advantageous not only as giving the desired fishing height to the center portion of the bar, but also because it renders available sufficient metal to be redistributed to force the fishing surfaces of the head and the flange, at the center portion of the bar, against the corresponding surfaces of the dies, thus assuring accurate forming of such fishing surfaces. This is highly important, as these fishing surfaces, particularly at the center portion of the bar, must be accurately spaced and accurately formed for proper bearing contact with the cooperating surfaces of the rails. While I have illustrated and described the bar as being reformed by tapering the entire section thereof from each end toward the center portion of the bar, this is not essential in some cases, as will be later explained, and I do not intend to limit myself to this one method of producing the bar.

The bar illustrated in Figures 8 and 11 may be considered as being produced from a worn bar reformed to restore the original fishing height of the center portion thereof, such bar being initially uncrowned.

This reformed bar is adapted for use with new or unworn rails, it being noted in Figure 11 that the fishing surface of the right hand side of the rail head is at the same height as the fishing surface at the left hand side of the rail head.

All of the figures of reformed bars so far described, or to be described, may also be considered as illustrative of sections taken across the die cavity when the dies are closed. The amount of thinning of parts or all of grooves at the central portion are accurately measurable in the dies but are difficult to measure in the finished bars for the following reasons.

The ordinary rail joint has take-up space between bar head and rail web of about 3/16″, the fishings being so angled that wear of 3/32″ in fishing height uses all take-up space and the joint's life is ended. This 3/32″ of worn fishing height may be taken as half in the rail ends and half in the bar, so that when the bar has lost 3/64″ in fishing height, it is worn out. The head fishing of the bar being generally of less area than the flange fishing, wears most, so that 1/32″ may be taken as the bar's head fishing wear, and 1/64″ as the bar's flange fishing wear. In reforming, the head and flange fishings are restored independently. Taking the head fishing as the one where movement of metal must be greatest, the problem in reforming to the original fishing height is to move one surface, the head fishing, 1/32″ upward. If this be accomplished by bevelling or thinning at center on one surface only, the bevelling thus applied would show the bar thinned 1/32″ at center on the one surface. However the head of a modern bar, detached, may be considered as having 6 surfaces, and as thinning the die cavities at center may be applied on 5 surfaces to elevate the 6th which is the head fishing surface, the 1/32″ of thinning on one surface, distributed over 5 surfaces, would show a thinning at the center of the closed die cavity of 1/160″ on each surface, readily measurable on the dies but difficult to detect on the bar produced. It can thus be seen that the small amount of wear which makes a bar scrap and the small amounts of thinning various members at center to restore the worn parts of the bar, call for only slight thinning of the die cavity at center, and yet it is these small amounts that mean so much in the proper restoration of the worn fishing surfaces. To thin various members of a die cavity at the central portion so that this thinning is not restricted to any one surface, means that the metal is moved evenly and not distorted in any one place, and that the bar, although thinned at the central portion by a die cavity thinned at the central portion, is not thinned enough to be objected to, the inspection for this in the reformed bar being far less exacting than the close machine work on the dies.

In Figures 9, 10 and 12, I have illustrated a bar formed by the same method as the bar of Figure 8. It will be noted, however, that the bar of Figure 9 is of greater vertical height at its center portion than at its end portions. Center portion 11$^a$ of web 11 is of greater vertical height than end portions 11$^b$ of the web, these end portions of the web tapering in vertical height from the center portion 11$^a$ to the ends of the bar. It will also be noted, by reference to Figure 10 that the center portion 12$^a$ of head 12 is of less vertical height and less horizontal thickness than the end portions 12$^b$ which taper in thickness from the ends of the bar to the center portion 12$^a$. The center portion 12$^a$ of the head is higher than the ends of the bar, and the center portion 13$^a$ of the flange 13 is of less vertical thickness than the end portion 13$^b$ of the flange, these end portions tapering in thickness from the ends of the bar to the center portion thereof, and the center portion 13$^a$ extends below the end portions 13$^b$. Center portion 11$^a$ of web 11 is of less thickness horizontally than the end portions 11$^b$, as shown in Figure 10, the end portions of the web tapering in thickness from the ends of the bar to the center portion 11$^a$. The closed die cavity for forming the bar of Figures 9, 10 and 12 is, in general, of the same general structural characteristics as the die construction for making the bar of Figures 8 and 11, except that in the die for the bar of Figure 9 provision is made so that in the formed bar the web tapers vertically as well as horizontally and the center portion of the bar is of greater height than the end portions, thus producing a bar which is crowned both at the head and the flange.

In Figure 12, I have illustrated a rail 14 having two bars constructed as in Figures 9 and 10 applied thereto, one of the bars being shown in end view and the other bar being shown in central section. As will be noted, the central portion 11$^a$ of the web of the bar at the right hand side of the rail is appreciably higher and thinner than the end portions 11$^b$ of the web of the bar at the left hand side of the rail. It will also be noted that the head fishing surface and the flange fishing surface of the right hand bar are respectively higher and lower than the corresponding surfaces of the left hand bar. This bar is illustrated as applied to a rail 14 which has been in use some time, the center portion of each of the head and flange fishing surfaces 15 and 16, respectively, of the rail having been worn away to a much greater extent than the end portions 17 and 18 of such surfaces, which may be considered as not worn.

This bar is thus well adapted for use with worn rail ends. Under some conditions, a bar constructed in this manner, though not so heavily crowned, may be used with new or slightly worn rail ends, the vertical bevelling of the end portions 11$^b$ of the web 11 of the bar permitting the end portions of the bar to be drawn inwardly sufficiently to position the ends of the bar head beneath the rail head.

It may be noted from examination of Figs. 17 to 20 inclusive that the various bar surfaces thinned at center preserve substantially the same inner and outer profiles at the center as at the ends, the profiles and section at the ends corresponding closely to those of the original bars. This means that the ends of the reformed bar retain the original contour and section as near as practical, and the same is true of the center except for the slight thinnings previously described. This is my preferred method and its purpose is to avoid the use of abrupt projections in the dies at center, such as would distort the bar section and materially change the contours or profiles of the inner or outer surface of head, web or flange, or materially thin any part of the bar sharply on only a part of any surface. Such thinning as I do on any surface is directed to the whole surface and not merely to a portion of it. For example in Fig. 17, the thinning at center on surface 41 is applied slightly to the surface as a whole and not deeply to a restricted portion of the surface, the purpose being to secure greater pressure or movement of metal at the central portion of the bar than at the ends by a longitudinal convexity in the die and not by any pronounced projection in the die such as would distort the surface at center and materially change its contour. In other words, I accomplish thinning at center by subjecting one or more surfaces to broad, shallow draughts and not narrow, deep draughts, avoiding distortion of the bar section and securing proper movement of metal to the fishing surfaces at center by using longitudinal convexities in the dies, which apply greater draughts at the center of the bar, these draughts tapering off to the ends. The reformed bar section and the inner and outer contours transversely then correspond closely to those of the original bar. In Figs. 10 to 12 inclusive, the differences in thicknesses of various parts of the bar are shown greatly exaggerated to facilitate description. These differences are really very slight, and the result in the reformed bar is successful restoration of the worn central as well as end fishing surfaces without appreciable deformity.

There are special cases where a bar of one type is to be reformed into a bar of another type, so that the reformed bar is altered in transverse section and contour. For example, a head contact bar is to be reformed into a head free bar, wherein the head is moved inward and the flange outward in its position to the rail, and the fishing angles may be changed. In such cases the reformed section may be altered considerably from the original section but the thinning at center is accomplished as before by longitudinal convexities thinning one or more surfaces as a whole, slightly and not in part deeply so as to result in too localized thinning or distortion by the use of sharp projections in the dies. In such cases, while the transverse section and contours may be altered from the original, they are similar in the reformed bar at center and ends except for the slight thinning at center.

I wish to make it clear here that when I speak of applying pressure to an entire surface, this may be modified to suit particular needs. For example, in Fig. 18, the thinning at 46 may taper out to nothing at the outer extended portion to shorten the width of flange fishing and provide easement. Similarly in Fig. 20, the thinning at 52 may taper to nothing above so as not to decrease the width of head fishing. As the amounts of thinnings at center are smaller than shown in Figs. 17 to 20 inclusive, it can be seen that these variations are not great enough to materially distort the transverse section or contour.

While adherence to the original section and avoidance of its distortion is preferable, there may be cases where pronounced distortion is called for, such as would result from abrupt projections in the dies. When the use of such projections are advisable, these projections will be made thicker horizontally or vertically or both at center, tapering to the ends where these projections are made thinner, thereby presenting one or more convex working surfaces, so that the bar will be distorted as a whole and not locally at the central portion, thereby graduating the pressure from center to ends and securing even draughting as between center and ends, as would result from maintaining a proper balance of pressure by concentrating pressure at center to secure considerable lateral movement of metal and relieving resistance at the ends where the bar more quickly fills the dies.

In speaking of the central portion of dies or bars this means the central eight inches or so measured longitudinally, thinned to draught the more worn part of the bar. The transverse sectional contour refers to the inner and outer profiles of the cross section. The foot portion of a bar may be flanged or of any desired form. The surface of a die opposite to a fishing surface would be at 41 or 43 in Fig. 17 or at 46 or 47 in Fig. 18. A surface of a die adjacent to a fishing surface would be at 42 in Fig. 17 and at 52, 55 and 57 in Fig. 20.

In Figures 13 to 16, I have illustrated a pair of dies for forming bars in accordance with my invention. The lower female die 20 is provided with passes 21 and 22 for reforming the head and the flange, respectively, of a bar. These passes are disposed at opposite sides of a center raised portion or block 23. The center portion 24 of this block is provided with a horizontal upper face and the side edges 25 of this portion are parallel with the side edges of the die. The center portion 26 of pass 21 is parallel with portion 24 of block 23, and the center portion 27 of pass 22 is also parallel with portion 24 of the block. Each end portion 28 of block 23 tapers in width outwardly to the end of the die and the upper face of such end portion is inclined or bevelled downwardly to the end of the die.

The end portions 29 and 30 of the passes 21 and 22, respectively, are disposed parallel to end portions 28 of block 23, that is, the end portions of the passes are also inclined downwardly to the ends of the die and the end portions 29 and 30 of the passes at each end of the die converge toward the end of the die. The die 20 is further provided with an inclined surface 31 extending upwardly and outwardly from the outer edge of pass 21. This die 20 coacts with an upper male die 32 having a block or extension 33, which enters the recess of die 20. The center portion 34 of extension 33 has its upper face horizontal and the under face of each end portion 35 of this extension is tapered or inclined upwardly to the end of the die from the center portion 34. Die 32 is provided with a pass 21ª similar to pass 21 of die 20, and with an inclined shoulder 31ª which coacts with surface 31 of die 20 to form a die lock. The end portions 35 of extension 33 taper in width outwardly from the center portion 34 of such extension, and the end portions of pass 21ª are disposed parallel with the end portions 35 of the extension, the center portion of this pass being parallel with center portion 34. Block or extension 33 is provided, at the side thereof remote from pass 21ª with a center forming surface 36 and end forming surfaces 37, the surface 36 being parallel to the adjacent side of die 32 and the surfaces 37 being inclined or tapered inwardly of the die transversely thereof from the surface 36 to each end of the die. The surfaces 36 and 37, when the dies are in operative relation, are disposed in parallelism to surfaces 36ª and 37ª, respectively, of pass 22 of the lower male die 20. The under face of block 33 of the upper die is convexed downwardly to a greater extent than the upper face of block 23 of the lower die is convexed upwardly, as clearly illustrated in Figure 15.

It is to be noted that the passes in the dies taper in depth from each end of the die to the center portion of the pass. These passes also taper in width from the ends of the die to the center portion of the pass which is narrower horizontally than the end portions of such pass. A bar formed in such a die will be tapered in thickness throughout its entire section from each end to the center portion thereof. This construction of die is thus adapted to produce a bar similar to that illustrated in Figures 9, 10 and 12. In the die structure illustrated, by way of example only, I have shown the passes and forming surfaces as defined by straight lines. I contemplate, however, the use of dies in which the passes and forming surfaces may be formed by arcuate or curved lines, or even stepped lines if desired. The die structure illustrated and described is by way of example only and, in actual practice, may be varied within wide limits, so as to taper the bar throughout its entire section from the ends to the center portion, or the die may be formed to taper one or more elements of the bar without tapering the entire section thereof.

For convenience in description, I have considered the dies as being disposed in horizontal position, when used, the lower die being fixed and the upper die being movable and subjected to pressure in any desired manner. It will be evident, however, that the dies can be supported in any one of a plurality of positions and either or both of the dies may be movable, pressure being applied to the dies in any suitable manner.

As will be clear from Figures 13 and 14, the contacting inclined surfaces 31 and 31ª of the die lock coact, in the final closing of the dies, to shift die 32 laterally toward the flange of the bar. This is advantageous as subjecting the flange to forming pressure applied thereto in a direction substantially at right angles to the direction of the initially applied pressure. Assuming that the upper die 32 is closed under pressure, the bar is first subjected to vertical pressure, and, in the final closing of the dies, this vertical pressure is, in part, converted by the die lock into horizontal pressure applied to the opposite faces of the flange of the bar.

Figure 18:
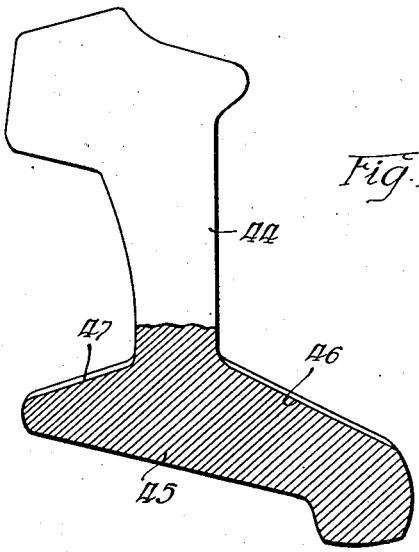
Figure 18 is an end view of another modified form of bar showing the flange portion sectioned at the center of the bar.

In Figures 17 to 20, I have illustrated various ways of thinning or bevelling the different elements of a bar so as to either restore or increase the height of the fishing at such portion. In Figure 17, I have shown a bar 38 of I-beam type in which the center portion of the head 40 thereof has been reduced or tapered at 41 by pressure applied to the under face of the head. This bar may also be reduced or tapered at 42 by pressure applied to the outer upper face of the head and, under such conditions, the head may be further tapered or reduced at 43 by pressure applied to the under face of the outer reinforcement for the head. If the bar is not badly worn and it is desired to restore the height of the fishing, the taper at 41 is frequently sufficient. In other cases, this taper may be supplemented by tapering the head at 42 and 43. To produce such a bar, the head forming passes of the dies would be shaped so as to exert the desired pressure on the selected surfaces of the center portion of the head for producing the desired taper, the flange passes of the dies and the surfaces for forming the web of the bar being such as not to alter the cross-section of the web and the flange, though acting to accurately reform the fishing surface of the flange. In Figure 18, I have illustrated a bar 44, the fishing height of the center portion of which has been restored by tapering the flange 45 at 46 and 47. This tapering of the flange is effected by pressure exerted on the upper face thereof, the displaced metal being caused to flow toward the head of the bar, so as to restore the fishing height at the center portion thereof. For producing this bar, the flange pass and forming surfaces of the dies are properly formed to displace the metal at 46 and 47, thus tapering the flange portion of the bar without tapering the other elements thereof.

Figure 19:
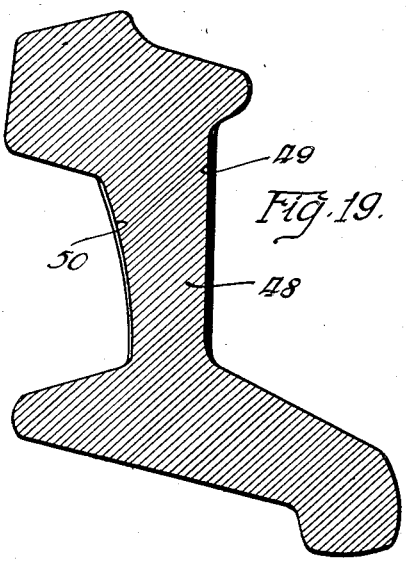
Figure 19 is a view of a third modified form of bar, this view being a section on a vertical plane at the center of the bar.
Figure 20:
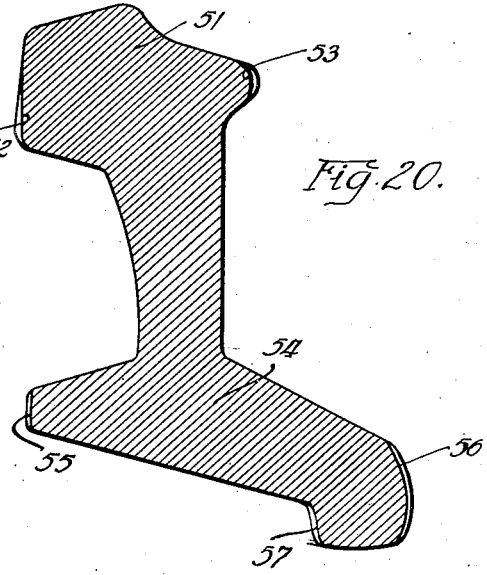
Figure 20 is a central sectional view through a fourth modified form of bar.

In practice, both portions of the flange 45 may be tapered, as illustrated, or either the inner portion or the outer portion of the flange may be tapered, and this taper may be applied either to the under face or the upper face of the flange. Tapering of the flange is particularly important when applied to the upper and outer portion, as the pressure required in reforming is largely consumed in properly reforming the flange fishing. As the main problem is to properly reform the central portion where the most wear has occurred, pressure along the flange of the bar must be so applied as to effect more spread of metal there than at the ends or between the central portion and ends. The die cavity for the flange is therefore thinned at the central portion and made thicker from there toward each end, reducing the resistance intermediate between center and ends. The reduction of intermediate resistance is of the utmost importance. The bar not being much worn there, so fills the dies that pressure applied there cannot effect much lateral movement of metal which having no place to go becomes almost incompressible, and even enormous pressure will not overcome it. The reduction of intermediate resistance is therefore far more important than concentration of pressure at center, although both are dependent upon each other and directed toward the same purpose. The flange portion of a bar being thin and broad must have the intermediate portions between center and end reduced so as to reduce the large area of resistance opposing movement of metal at the central portion. The same is true of the broad thin web, although the web does not play the important part in reforming, as does the flange. In Figure 19, I have illustrated a bar in which the fishing height at the center portion has been restored or increased by tapering the web 48 by pressure applied to the opposite faces thereof at 49 and 50. Either one face of the web may be tapered, or the web may be tapered from both faces thereof, as desired. In Figure 20, I have illustrated a bar in which the head 51 has been tapered by pressure applied thereto transversely of the bar at 52 and 53, the flange 54 having also been tapered by pressure applied thereto at 55, 56, and 57. To produce this bar, the dies are, of course, properly shaped to provide the desired pressure at the selected portions of the bar.

The horizontal thinning of head or flange as in Figure 20 is employed with caution, for it is not good practice to narrow the widths of fishing at center, this being particularly true of the portion which I would prefer to make wider if possible. Moderate narrowing of the fishing may be necessary in some cases but the preferred method, as shown in Figure 20, is to confine thinning of the head to that part which is beneath the head fishing, so that thinning of the head at center is accomplished without narrowing of the head fishing.

In cases where it is desired to produce a heavily crowned bar from a badly worn bar, I preferably taper the entire section of the bar, thus rendering available metal for crowning the bar without thinning the center portion thereof to an undesired extent, the web portion cavity in the dies frequently being left thickened from end to end or untapered where work upon the web is not necessary for the proper reducing of the bar. Where it is desired to restore the fishing height of a bar which is not badly worn, this may be accomplished by tapering one or more of the elements of the bar, as suggested in Figures 17 to 20, inclusive. The tapers of these figures may be combined in numerous ways to produce the desired result. If it is desired to restore the fishing height of the center portion of a badly worn bar, I prefer to taper the entire section of the bar, as in the bar illustrated in Figure 8. Also, I contemplate producing crowned bars which may be crowned both at the head and the flange, or may be crowned at the head only or at the flange only, as conditions may require. It will be obvious that bars formed in accordance with my method may be produced in great variety, such bars involving the principle of my invention, which consists in either restoring or increasing the fishing height of the center portion of a bar by tapering one or more elements of the bar or the entire section of the bar from the end portions to the center portion thereof. While my method is particularly adapted for reforming worn bars so as to render them again useful, it can also be used for forming new bars and I do not, therefore, limit my invention to the reforming of worn bars. Furthermore, while my invention is particularly adapted for forming angle bars, it may be used for forming bars of other types, several of which are well known in the art, and I do not, therefore, confine my invention to angle bars.

In Figures 21 to 33, I have illustrated a series of members, which may be considered as angle bars in side view representing closed die cavities. These figures illustrate the various ways in which the tapering of the head and the flange of the bar may be varied and combined to produce the desired effect. It will be noted that this desired taper can be produced either by the use of straight lines or curved lines or by a combination of the two. The bar of Figure 21, designated 58, is crowned at both head and flange, this crowning being produced by tapering the head and flange, this taper being defined by straight lines, it being understood that the web portion of the bar may also be tapered. Bar 59 of Figure 22 is crowned at the head, the head of the bar being provided with a straight line taper and the flange of the bar having an arcuate or curved taper. Bar 60 of Figure 23 is the reverse of bar 59, being tapered at its flange only. Figures 26, 27 and 28 illustrate crowned bars in which the head and flange are tapered, the taper being defined by arcuate or curved lines. Bar 61 of Figure 26 is provided with a head crown only. Bar 62 of Figure 27 is the reverse of bar 61 and is provided with a flange crown only. Bar 63 of Figure 28 is provided with both a head crown and a flange crown. Bar 64 of Figure 24 is crowned at both the head and the flange and is provided with a straight line taper of these elements. Bar 65 of Figure 25 is provided with a flange crown only, the flange having a straight line taper and the head of the bar having an arcuate or curved line taper. This bar is the reverse of bar 66 of Figure 29, which has a head crown only. Bar 67 of Figure 30 has its head and flange each provided with an arcuate or curved line taper to restore the fishing height of the center portion of the bar, this bar being uncrowned.

The bar 68 of Figure 31 is uncrowned, the fishing height of the center portion of the bar having been restored by tapering the center portion of the web, the head and the flange of the bar being untapered. Bar 69 of Figure 32 is also uncrowned but has its flange and its head tapered, this bar having been reformed from a bar worn to a greater extent than the bar from which bar 68 of Figure 31 was produced. Bar 70 of Figure 33 is also an uncrowned bar similar to bar 69 except that in bar 70 the center portion of the tapered surface of the flange and the head, respectively, is defined by a straight line, the end portions of these elements being similarly defined, bar 70 thus having a straight line taper, whereas bar 69 has a curved line or arcuate taper. In all of the bars illustrated in the series shown in Figures 21 to 33, the web portion of the bar may be tapered or not, as conditions require. These bars are intended merely as being illustrative of the many possible variations of my invention, and are not to be considered as in any way limiting my invention to a particular form of bar shown.

In Figures 34 to 43, I have illustrated a series of elements which may be considered as showing in plan view either the heads or the flanges or even the webs of bars reformed by my method. In Figure 34, I have shown a bar 71 which tapers from each end to the center portion thereof, the center portion having been pressed in from both sides and the taper of the bar being defined by straight lines. In bar 72 of Figure 35, the center portion of the bar is pressed in to a less extent than in the bar of Figure 34 and from one side only.

In Figure 36, I have shown a bar 73 similar to bar 72 of Figure 35 except that the center portion is thinned or pressed in from the opposite side to that of bar 72. In Figures 37, 38 and 39, I have illustrated bars in which the tapers are defined by arcuate or curved lines. Bar 74 of Figure 37 is pressed inwardly from both sides thereof, whereas bar 75 is thicker at its center portion than bar 74 and is pressed inwardly from one side only. Bar 76 of Figure 39 is pressed inwardly from the opposite side thereof to bar 75. Bar 77 of Figure 40 tapers in a straight line from each end thereof to the longitudinal center of the bar, this bar being thinned or pressed inwardly from both sides thereof. Bar 78 of Figure 41 is thicker at its center portion than bar 77 and is pressed inwardly or thinned from one side only, the resulting taper being defined by two straight lines extending from the ends of the bar to the longitudinal center thereof. The bar 79 of Figure 42 is similar to bar 78 except that it is pressed inwardly from the opposite side to that of bar 78. The bar 80 of Figure 43 may be considered as a plan view of the head of a bar, the fishing height of which has been restored or increased by bevelling the web without decreasing the horizontal thickness of the center portion of the head. This figure may also be considered as a plan of the web of a bar, the fishing height of which has been restored or increased by bevelling either the head or the flange, or both, without bevelling the web. These various figures show diagrammatically the many die cavity forms that may be chosen from to obtain results, it being understood that in all cases one or more of the die surfaces do not press upon the corresponding bar surfaces at the ends of the bar.

Figure 43 can also be considered as an underneath view of the flange of a bar, the fishing height of which has been restored or increased by bevelling either the head or the web or both without bevelling the flange.

The various forms of bars shown in Figures 21 to 43, inclusive, are illustrative of the variations of thinning the closed die cavity at the central portion and are of course exaggerated for purpose of illustration.

It will be obvious from the above that it is possible to produce, by my method, an almost endless variety of die cavities in which one or more of the groove walls can be tapered, these various tapers being combined in a great variety of ways to suit the great variety of situations encountered in practice, reforming worn or unworn bars in such manner as to assure accurate forming and spacing of the fishing surfaces while avoiding undesirable thinning of any portions of the bar. It is to be noted that thinning of the center portion of the bar is not objectionable, since the most severe stresses to which the bar is subjected in use are vertical stresses and, by thinning the web of the bar its vertical height is increased so that the resistance of the center portion of the bar to vertical stresses is increased, rather than decreased, by thinning of the center portion thereof. This, I believe to be broadly new.

By thinning of the central portion of the bar, I mean rendering this portion of the bar of less thickness than the end portions. This may be done by applying pressure at the center portion of the bar in the manner above set forth, or, in some instances, the end portions of the bar may be tapered in fishing height and increased in horizontal thickness by pressure applied thereto in suitable manner.

From the preceding description it can be seen that, while my invention comprises a means for producing bars by making them thinner at the central than at the end portions by the use of dies with vertical and horizontal convex surfaces, the practical application of the invention is the use singly or in combination of the various die convexities best suited for each particular case. If the simplest form of bar—a flat strap—be considered, the bar is then merely a web, the pressure upon whose end portions may be relieved so as to better concentrate upon the central portion by making one or both dies longitudinally convex or tapering so that when closed, the die surfaces will be closer together at the central portion than at the end portions. However, many bars now in use are more complicated, having head and flange portions in addition to the web portion, thereby necessitating a more varied and more extensive use of die convexities, and as I find in practice, these convexities are more pronounced upon the dies than upon the bar reformed by them.

The necessity of varied applications of my invention to properly reform bars can be better understood by reference to Figures 17 to 20, inclusive, where it can be seen that a bar consists of three well-defined portions; head, web and flange.

If each portion be considered by itself, my invention applies as follows, as illustrated in Figures 17 to 20, inclusive, the bars being shown in their positions as when in use:—

1. Head thinned at central portion vertically by one or both die convexities as in Figure 17;
2. Head thinned at central portion horizontally by one or both die convexities as in Figure 20;
3. Web thinned at central portion horizontally by one or both die convexities as in Figure 19;
4. Flange thinned at central portion vertically by one or both die convexities as in Figure 18;
5. Flange thinned at central portion horizontally by one or both die convexities as in Figure 20.

The five applications of convex die surface noted are the key to my invention, used singly or in combination. My most extensive use of them is Nos. 1, 3 and 4, above, usually in combination. The invention may be applied to serve two purposes:—A concentration of pressure upon the central portion of the bar to properly reform the fishing surfaces of that portion; and A relief of pressure upon the end portions to reduce one or both of the fishing surfaces of those portions. The concentrated pressure at center is directed toward the proper reformation of badly worn bars into crowned or straight bars.

My invention may then be broadly defined as means for making a bar by pressure so applied as to concentrate upon the central portion or relieve the end portions thereof, said means comprising dies with one or more vertically or horizontally convex surfaces extending longitudinally, or by surfaces tapering from the central to the end portions, so that when closed, one or more of the head, web or flange cavities of the dies will be more restricted at the central than at the end portions thereof.

The dies are preferably made of tool steel. Under certain conditions, as when the dies are subjected to great pressure, they tend to straighten out at their central portions, due to their inherent resiliency, the outer faces of the dies becoming more or less bowed. This results in straightening the cavity between the dies, to a certain extent, reducing the taper thereof, with the result that the bar produced may be of uniform cross-section, or substantially so. In the forming of such bar, however, the pressure is initially applied and concentrated at selected portions of the bar in such manner that the fishing height and surfaces are accurately restored or formed in the manner previously described, whereby accurate reforming of the bar is assured. In its broader aspects, my invention resides in providing forming dies defining a cavity adapted for reception of a worn bar to be reformed, the elements of the dies defining such cavity being so related as to concentrate pressure on the more worn portions of the bar while relieving pressure on the less worn portions of the bar, thus assuring accurate reforming thereof.

What I claim is:

1. A die for reforming worn rail joint bars including a pair of opposing die members having cooperating die cavities defining a space generally corresponding to the rail joint shape, including intercommunicating spaces for the metal of the bar head, web and foot, certain of the longitudinal walls of said cavities being longitudinally convexed and the zenith of said convexities being in proximal relation to the most worn portions of the bar whereby to initially forge said bar at such points to flow the metal thereof into said worn portions prior to the complete closing of the dies on substantially the whole bar.

2. A die for reforming rail joint bars including a pair of opposing die members having cooperating die cavities defining a space generally corresponding to the rail joint shape, including intercommunicating spaces for the metal of the bar head, web and foot, said die having exposed within its cavity a longitudinally convexed die surface, whose zenith is disposed in the central part of the cavity whereby to initially concentrate a greater forging pressure on the central portion of the bar to flow metal to the most worn central portions thereof prior to the complete closing of the dies on substantially the whole bar.

3. A die for reforming rail joint bars including a pair of opposing die members having cooperating die cavities defining a space generally corresponding to the rail joint shape, including intercommunicating spaces for the metal of the bar head, web and foot, the said die having longitudinally convexed walls within its cavity of such greater curvature as to ease off the pressure toward the ends and substantially eliminate contact at such ends, and the zenith of said convexities being in proximal relation to the most worn portions of the bar to be filled out whereby to initially forge the bar at such portions prior to the complete closing of the die.

4. A die for reforming worn rail joint bars including a pair of opposing die members having cooperating die cavities defining when closed a space generally conforming to the bar shape smaller at the center than at the ends and including intercommunicating spaces for the metal of the bar head, web and foot, certain of the longitudinal walls of said cavities being longitudinally convexed substantially throughout their widths with the zenith of convexities in proximal relation to most worn portions of a bar in the die space whereby to forge said bar at said zenith to flow the metal thereof into its most worn portions initially, and prior to the closing of the die cavity walls upon the redistributed metal at the most worn portions of the bar and to the closing of selected die cavity walls on less worn portions of the bar.

5. A die for reforming worn rail joint bars including a pair of opposing die members having cooperating die cavities defining when closed a space generally conforming to the bar shape smaller at the center than at the ends and including intercommunicating spaces for the metal of the bar head, web and foot, certain of the longitudinal walls of said cavities being longitudinally convexed for substantially the length of the bar with the zenith of convexities in proximal relation to the most worn portions of a bar in the die space whereby to forge said bar at said zenith initially to flow the metal thereof into its most worn portions before the dies finally close on substantially the whole bar.

6. A die for reforming worn rail joint bars including a pair of opposing die members having cooperating die cavities defining when closed a space generally conforming to the bar shape smaller at the center than at the ends and including intercommunicating spaces for the metal of the bar head, web and foot, certain of the longitudinal walls of said cavities being longitudinally convexed with the zenith of convexities in proximal relation to most worn portions of a bar in the die space whereby to forge said bar at said zenith to flow the metal thereof into its most worn portions initially, and prior to the closing of the die cavity walls upon the redistributed metal at the most worn portions of the bar and to the closing of selected die cavity walls on less worn portions of the bar.

7. A die for reforming worn rail joint bars including a pair of opposing die members having cooperating die cavities defining when closed a space generally conforming to the bar shape smaller at the center than at the ends and including intercommunicating spaces for the metal of the bar head, web and foot, certain of the longitudinal walls of said cavities being longitudinally convexed for substantially the length of the bar with the zenith of convexities in proximal relation to most worn portions of a bar in the die space whereby to forge said bar at said zenith to flow the metal thereof into its most worn portions initially, and prior to the closing of the die cavity walls upon the redistributed metal at the most worn portions of the bar and to the closing of selected die cavity walls on less worn portions of the bar.

In witness whereof, I hereunto subscribe my name this 30th day of March, 1929.

GEORGE LANGFORD.